United States Patent

[11] 3,593,922

| [72] | Inventor | George M. Standal<br>1916 San Fernando Place, Victoria, British Columbia, Canada |
|---|---|---|
| [21] | Appl. No. | 15,129 |
| [22] | Filed | Feb. 27, 1970 |
| [45] | Patented | July 20, 1971 |

[54] SPRINKLER
8 Claims, 12 Drawing Figs.

[52] U.S. Cl. ................................................. 239/242, 74/42
[51] Int. Cl. .................................................. B05b 3/16
[50] Field of Search........................................... 239/242, 255; 74/42, 43

[56] References Cited
UNITED STATES PATENTS
3,354,730   11/1967   Thompson................... 239/242 X 2,932,457   4/1960   Ballard ..... 239/242
3,063,646   11/1962   Ballard ..... 239/242

*Primary Examiner*—M. Henson Wood, Jr
*Assistant Examiner*—Edwin D. Grant
*Attorney*—Wells, St. John & Roberts ABSTRACT: A lawn sprinkler of the oscillating type modified from the conventional structure to even water distribution over the area covered thereby. A spring-loaded crank is interposed between the motor drive shaft and the oscillating spray pipe to accelerate movement of the spray pipe a the driving crank arm assembly moves overcenter. A controllable friction brake is provided to retard movement of the spray pipe in a preselected pattern so as to insure more even distribution of water during movement of the spray pipe.

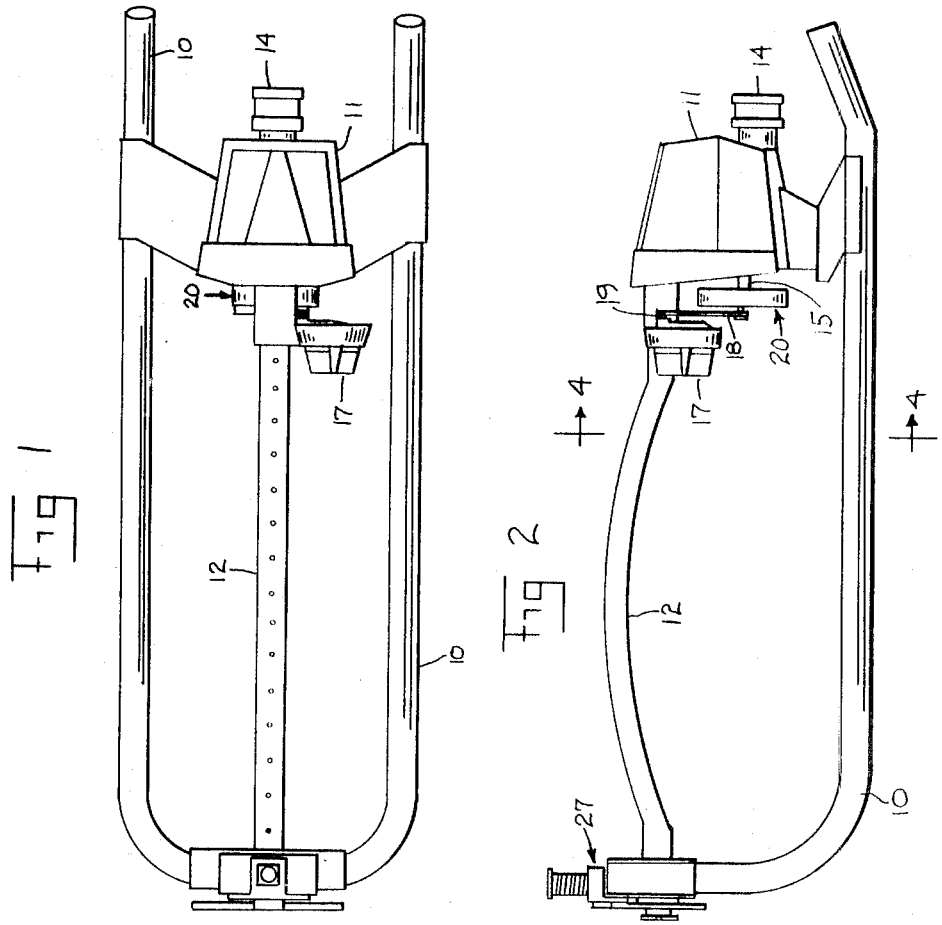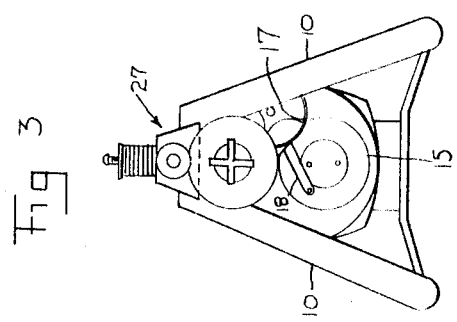

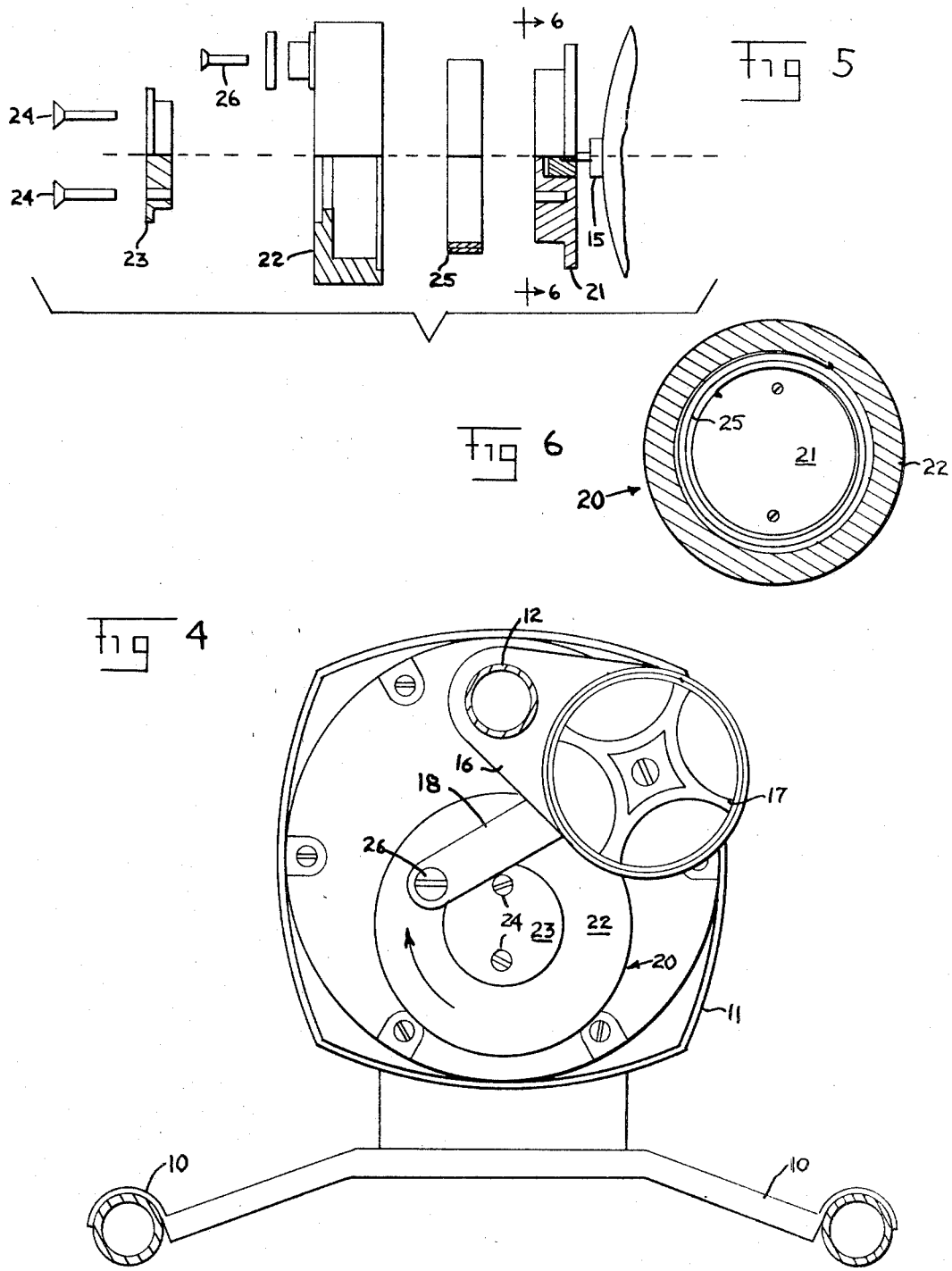

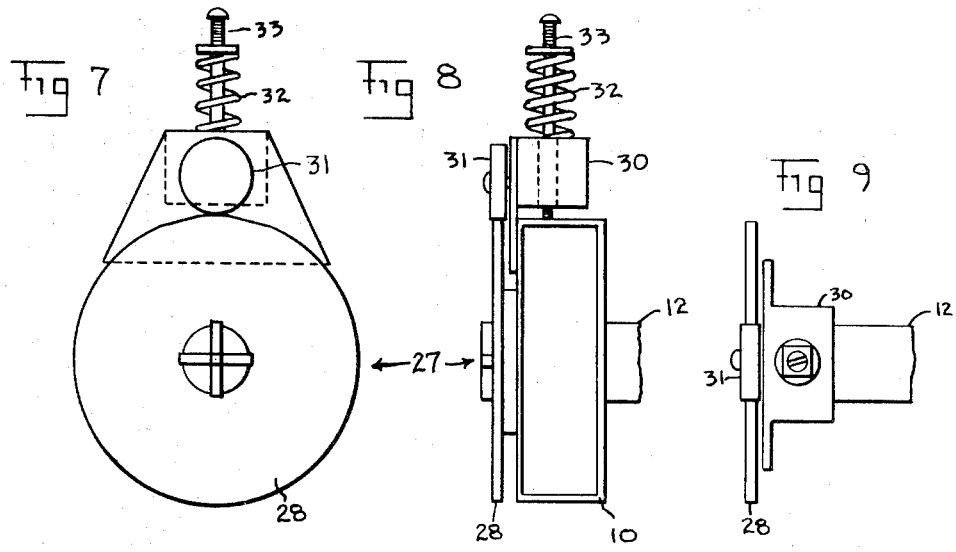
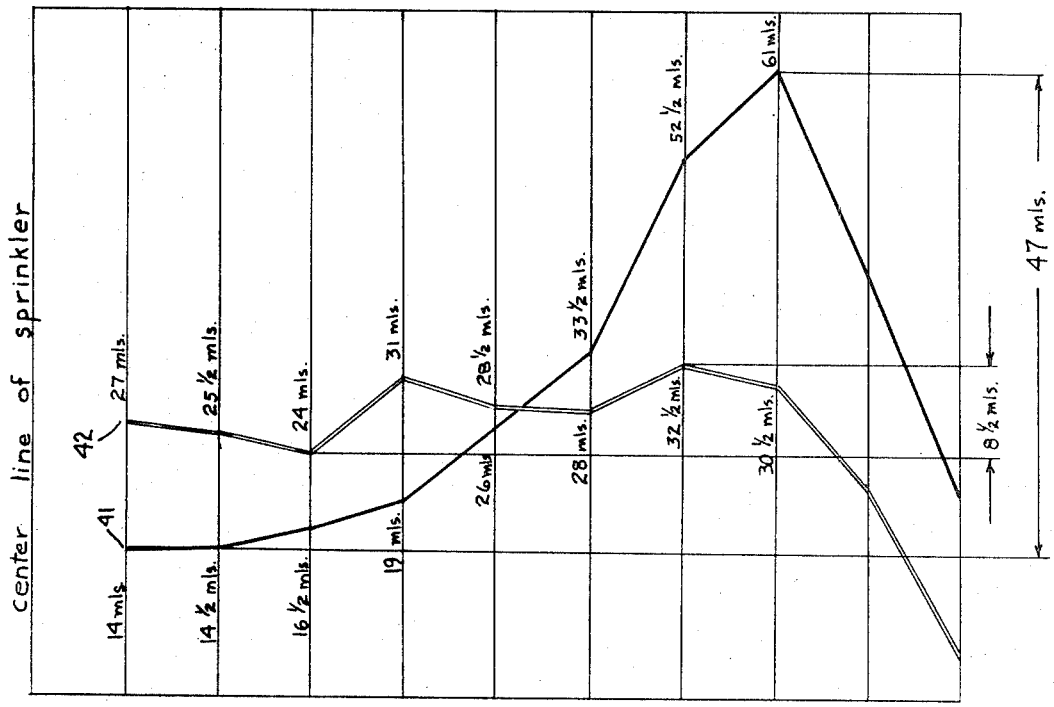
INVENTOR.
GEORGE M. STANDAL

INVENTOR.
GEORGE M. STANDAL
BY
Wells, St. John & Roberts

SPRINKLER

BACKGROUND OF THE INVENTION

The modified sprinkler described below was developed as a solution to the recognized problem of uneven water distribution across the area of lawn or garden irrigated by use of a conventional oscillating garden sprinkler. Such sprinklers conventionally are crank driven from a constantly rotated motor drive shaft that oscillates the spray pipe. As the pipe rocks about its axis from one side to the other, considerably greater amounts of water are received at the outside edges of the sprayed area than at the center, requiring that portions of the area be either overwatered or underwatered, and resulting in inefficient sprinkling and water usage.

A number of prior patents recognize this difficulty and have proposed various mechanical expedients in an attempt to correct it. These include the U.S. Pats. to Porter, No. 2,461,768, Sorensen, No. 2,621,967, Wehner, No. 2,673,122, Smith, No. 2,886,250, Smith, No. 2,942,789, Ballard, No. 3,063,646, Kooi, No. 3,261,553 and Chow, No. 3,430,860. However, each of these prior solutions has involved radical modification of the conventional sprinkler assemblies, typically involving changes in the hydraulic motor used as the power source for moving the sprinkler spray pipe. According to the present disclosure, the motor and water supply connections conventionally used can be continued in use without any changes whatsoever. The present invention can be applied to a conventional sprinkler by substituting the driving crank described below in place of the conventional rigid crank driven by the rotating motor, and by adding to the apparatus an exterior brake that can be mounted without modifying the existing structural arrangement.

SUMMARY OF THE INVENTION

The invention described herein relates to a modification of existing types of oscillating lawn sprinklers. The modifications relate specifically to the use of a rotatable crank assembly in the drive mechanism for the oscillating spray pipe, wherein the crank is spring loaded so as to be capable of absorbing a portion of the energy output from the rotating motor during movement of the spray pipe and cyclically releasing the stored energy during reversal of direction of the spray pipe angular movement to thereby accelerate the normal movement of the crank assembly as it moves overcenter. In addition, a frictional brake may be used to selectively retard movement of the spray pipe in a pattern such as to insure more even distribution of water than is conventionally possible.

It is a first object of this invention to provide a unique modification for existing oscillating sprinklers which can be adapted to such sprinklers without redesign of the motor mechanism that turns the spray pipe from side to side.

Another object of the invention is to provide an effective driving arrangement for oscillating sprinkler which minimizes the time required to move the driving crank arm assembly overcenter during sprinkling of the edges of the area being irrigated.

Another object of the invention is to provide a mechanically simple modification which does not add appreciably to the cost of producing such a sprinkler and which greatly increases the efficiency of the sprinkler in normal irrigating use.

These and further objects will be evident from the following disclosure, taken together with the drawings, which illustrate a preferred form of the invention embodied in a modified conventional sprinkler arrangement.

BRIEF DESCRIPTION OF THE DRAWINGS

FIG. 1 is a top view of a modified sprinkler embodying the elements of this disclosure;

FIG. 2 is a side elevation view of the sprinkler shown in FIG. 1;

FIG. 3 is an end view of the sprinkler taken from the left in FIG. 2;

FIG. 4 is an enlarged sectional view taken along line 4-4 in FIG. 2;

FIG. 5 is an enlarged exploded view showing the spring-loaded crank, the upper half of the view being in elevation and the lower half being sectioned;

FIG. 6 is a sectional view through the assembled crank as it would be seen along the plane designated 6-6 in FIG. 5;

FIG. 7 is an enlarged end view of the friction brake assembly;

FIG. 8 is a side elevation view of the brake assembly shown in FIG. 7;

FIG. 9 is a top view of the brake assembly shown in FIG. 7;

FIG. 10 is a graph illustrating water distribution;

DESCRIPTION OF THE PREFERRED EMBODIMENTS

Figure 11:
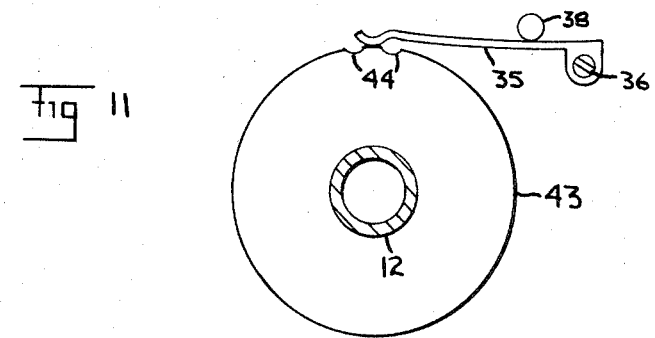
FIG. 11 is an end view similar to FIG. 7, showing a modified brake structure.

The present apparatus is presented as a mechanical modification of conventional oscillating type lawn sprinklers. The illustrated sprinkler is of the type commonly available for residential lawn and garden use, being attached by hose to a source of water under pressure for irrigation usage. In such sprinklers, a supporting frame rests on the ground in a fixed position, and water under pressure is directed to a longitudinal spray pipe having a row of perforations through which long jets of water are directed outwardly in an arc. During the application of water, the spray pipe is oscillated or rocked back and forth to distribute the water across a generally rectangular surface area. The spray pipe is oscillated by a water-driven motor through reduction gearing and a crank assembly that converts the constant rotational movement of the motor drive shaft to an oscillating rocking movement of the spray pipe. The crank assembly typically includes a selector dial by which the crank pivot position can be manually set in various positions to select patterns of oscillation depending upon the nature of the area being irrigated. The present disclosure is not concerned with the details of the motor mechanism or the dial adjustment, and is applicable to any available type of oscillating sprinkler having such common features. Many examples of such devices are commercially available and further mechanical details as to the conventional drive or conventional dial adjustment can be found by reference to the patents listed above.

Taking the generally conventional elements of the sprinkler first, it includes a bent tubular frame 10 that is adapted to rest upon the ground surface in a stationary location during use of the sprinkler. This frame or base could be of any desired rigid structure capable of supporting the moving elements of the sprinkler. Mounted to the frame 10 is a sealed motor housing 11 that serves as a water receptacle and as a protective enclosure for the water-driven motor that powers the sprinkler. An elongated curved spray pipe 12 is pivotally mounted about a longitudinal axis by a bearing connection at one end within motor housing 11 and at the remaining end by an outer bearing 13 mounted to the frame 10. The mounting of the spray pipe 12 within the motor housing 11 includes suitable gaskets to prevent leakage of water directed to the spray pipe 12. Within the motor housing 11 there is provided suitable diversion devices for directing water to the spray pipe 12 after all or a part of the water flow has been utilized for turning the water wheel or turbine that acts as a motor. A hose connection 14 is provided for attachment to a garden hose or other suitable source of water under pressure.

The output of the water motor is in the form of a drive shaft 15 that protrudes from the face of the motor housing 11, and which typically is located vertically beneath the spray pipe 12. The longitudinal axis of the rotatable drive shaft 15 is parallel to the pivotal axis of the spray pipe 12. A crank assembly is operatively connected between the drive shaft 15 and spray pipe 12 to convert the constant rotational movement of shaft 15 about its axis into oscillating angular movement of spray pipe 12 about its respective axis. A crank arm 16 is fixed to the spray pipe 12 and is pivotally connected to a rigid connecting link 18 by means of a rotationally adjustably dial 17. The pivotal connection between link 18 and crank arm 16 is shown at 19. The dial 17 is capable of angularly positioning the pivotal connection 19 at several locations about the center of the dial, whereby the limits of angular movement of spray pipe 12 can be varied to produce various types of spray patterns. By use of dial 17 one can conventionally set the sprinkler for a full pattern from one side of the centerline of the sprinkler to the other, to a partial pattern that extends from side to side by a lesser distance or to a pattern extending from the centerline to either side of the sprinkler. All of the above structure is generally conventional in such sprinklers, and further details with respect to these elements is not believed to be essential for a full understanding of the present improvements.

Referring now to the drawings, the modifications made with respect to the conventional sprinkler assembly relate to the substitution of a spring-loaded crank arm in the outer drive mechanism between drive shaft 15 and connecting link 18, plus a spring-loaded frictional brake assembly 27 operatively engaged with the spray pipe 12. All other elements of the sprinkler remain unchanged.

The spring-loaded crank arm assembly 20 is shown in detail in FIGS. 4, 5 and 6. It comprises a central or inner disc 21 and a coaxial outer casing 22. The inner disc 21 is centered with respect to the drive shaft 15 to which it is fixed. The outer casing 22 is rotatable with respect to the disc 21 and is held in place by a retaining disc 23 secured to inner disc 21 by screws 24.

A coiled spiral spring 25 is interposed between the outer periphery of disc 21 and the inwardly facing annular shoulder of casing 22. Its inner end is fixed relative to the periphery of disc 21 and its outer end is fixed to the shoulder of casing 22 (FIG. 6). Spring 25 is wound in a direction such as to transmit driving force from disc 21 to casing 22 while building up tension in the spring 25 for energy storage purposes.

The driving end of connecting link 18 is pivotally mounted to casing 22 by a crank pin 26 whose axis is radially offset from the axis of drive shaft 15.

In the normal sprinkling of a flat lawn or garden surface by an oscillating sprinkler, the constant speed rocking movement of spray pipe 12 projects water 20 feet or more into the air, where it then falls vertically to the ground. Because of the elevated arc of the water, the resulting transverse velocity of the falling stream is slowed considerably toward the outer end of each stroke and is greatly increased toward the centerlines of the sprinkler, where only a few degrees of oscillation result in the coverage of several feet across the ground area. To counter this, the spring-loaded crank assembly is capable of absorbing a portion of the turning moment or energy otherwise directed to spray pipe 12 during movement of the spray pipe. This energy is then cyclically released at the end of each stroke as the connecting link 18 is accelerated overcenter. This results in a slowing of the angular velocity of spray pipe 12 during the stroke and an increase in its velocity of angular movement adjacent the outer end of each stroke. Since no power is required at the end of the stroke because the pipe 12 is not being moved, the built-up tension or energy stored by spring 32 is released to flip the outer casing 22 relative to disc 21. This greatly shortens the "dwell" time otherwise encountered at the extremities of angular movement of spray pipe 12.

To augment the variation in movement provided by the spring-loaded crank 20, a spring-loaded frictional brake assembly 27 may be utilized. As seen in detail in FIGS. 7, 8 and 9, this assembly comprises a generally circular disc 28 fixed to the outer end of spray pipe 12 and coaxially mounted relative to the spray pipe axis on frame 10. A frictional roller 31 engages the periphery of disc 28 to exert a controlled amount of resistance to turning movement of disc 28 and spray pipe 12. Roller 31 is carried by a vertically slidable block 30 movably mounted by a vertical screw 33 adjustably secured to the top of the outer end of frame 10. A compression spring 32 is interposed between the upper end of screw 33 and block 30, and serves to provide a controlled downward pressure force on roller 31.

To further retard the rate of movement of spray pipe 12 near its vertical position, there may be provided indented or flattened areas 34 to each immediate side of a plane through the spray pipe axis and containing the jets or apertures along the spray pipe 12. These flat areas permit roller 31 to accentuate its retarding action just as the spray pipe 12 is reaching its vertical position, when the transverse velocity of the falling water is at a maximum.

The spring-loaded brake assembly 27 is adjustable to permit one to control the amount of pressure built up within the spring-loaded crank assembly 20. By increasing the frictional resistance to turning of the spray pipe 12, one can increase the amount of energy stored within spring 25 and thereby increase the force that will cyclically flip connecting link 18 overcenter. By proper control of these two elements, the normal variation in water distribution across an irrigated area can be greatly diminished.

An actual example of the results which can be achieved by using a combination of the devices shown in FIGS. 1—9 is illustrated in graph 10. This graph shows actual measurement of water within containers spaced at equal distances outward from the centerline of an oscillating sprinkler. The distance from the sprinkler increases from left to right in the graph. The amounts of water measured are stated in milliliters. Line 41 illustrates the measurements made by use of a conventional unaltered sprinkler, showing a variation in water distribution totaling 47 milliliters, the largest amount being toward the outer edge of the irrigated area. Line 42 shows similar measurements made with respect to the use of the modified sprinkler using all of the other components conventional to the earlier tested model. The maximum variation that exists within the effectively irrigated area has been reduced to 8½ milliliters, and can be further reduced by refining and adjusting the mechanism. The variation in water distribution is almost one-sixth that achieved with respect to the conventional sprinkler.

Figure 12:
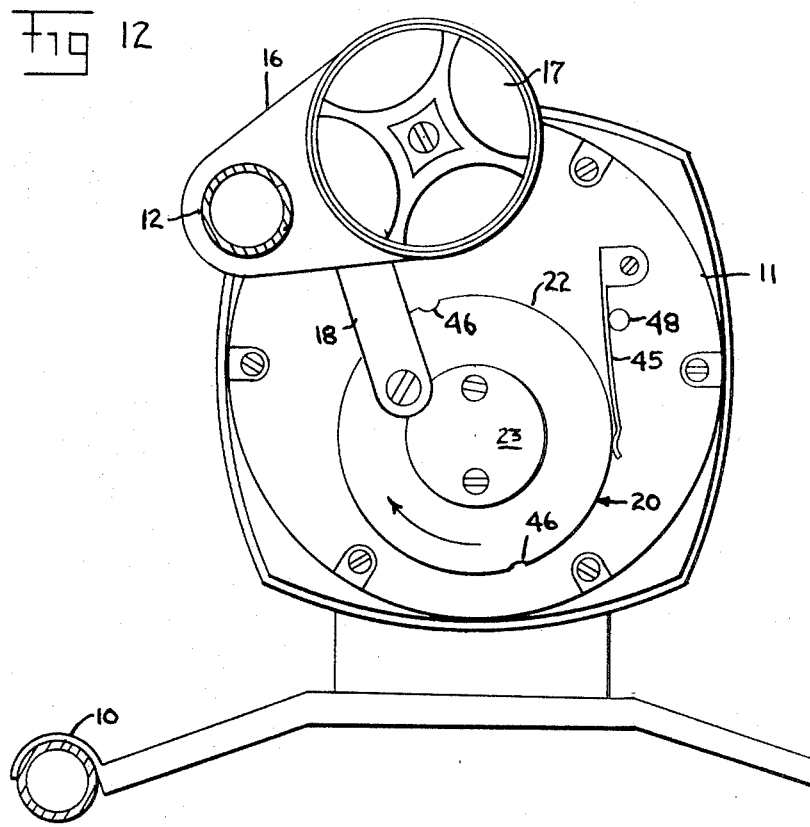
FIG. 12 is a view similar to FIG. 4, showing a second modification of the brake structure.

FIG. 11 shows a modification of the spring-loaded brake assembly. In this modification a spring clip 35 is pivotally mounted at 36 on the outer end of frame 10. A fixed bearing support 38 engages the upper side of clip 35 to maintain clip 35 in proper engagement against the disc 43 fixed to spray pipe 12. Disc 43 is provided with two notches 44 to each side of a plane containing the jets along spray pipe 12 and the spray pipe axis on frame 10. These notches serve to accentuate the retarding of angular movement of spray pipe 12 as the jets near the vertical position. Because of the spring-loaded crank assembly 20, it has been found that the first notch engaged by clip 35 will momentarily stop angular movement of spray pipe 12 until tension has been further increased in the spring 25. When the frictional resistance of the clip 35 has been overcome by the crank assembly, the built up energy will be released and will cause the clip 35 to jump the subsequent notch 44. On the return stroke, the opposite action will occur, thereby insuring proper distribution of water to each side of the sprinkler centerline A similar modification is shown in FIG. 12, mounting a spring clip 45 on the face of the motor housing 11. Clip 45 engages the periphery of casing 22, which is notched at angular positions corresponding to each side of the vertical position of spray pipe 12. These notches are indicated at 46. A bearing support 48 is mounted to the motor housing 11 to act against the clip 45 as previously disclosed. In this arrangement, the respective notches 46 will slow the spray pipe 12 as it is nearing the vertical position from each end of its stroke.

Many modifications are possible with respect to the basic structures illustrated. The spring-loaded crank and spring-loaded brake can be used individually or in combination. These features can be adapted to any conventional sprinkler of the type illustrated, and it is believed to be obvious to one skilled in this field that various dimensional changes might be required. For instance, FIG. 12 illustrates a sprinkler having the spray pipe 12 offset to one side of the center of the sprinkler, which has been found in some instances to achieve greater uniformity of water application. Such variations in the basic sprinkler apparatus do not substantially affect the application of the modifications discussed above.

Having thus described my invention, I claim:

1. In an oscillating lawn sprinkler of the type having:
   a fluid motor having a drive shaft rotated by an incoming stream of water directed to the sprinkler;
   a perforated spray pipe pivotally mounted about an axis parallel to the axis of the drive shaft; and
   a rotatable crank assembly operatively connected between the motor drive shaft and the spray pipe for converting constant rotational movement of the motor drive shaft to oscillating angular movement of the spray pipe;
   the improvement comprising:
   energy-absorbing means interposed in said crank assembly for cyclically absorbing a portion of the energy output from said motor during angular movement of the spray pipe and subsequently releasing the stored energy during reversal of direction of the spray pipe angular movement to thereby accelerate movement of the crank assembly overcenter.

2. A sprinkler as set out in claim 1 wherein said energy-absorbing means comprises:
   a first rotatable element mounted coaxially with the axis of the motor drive shaft and integrally rotatable therewith;
   a second independently rotatable element mounted coaxially with said first rotatable element;
   a rigid link pivotally connected to said second element about a pivot axis parallel to and spaced from the axis thereof, said connecting link being operatively connected to said spray pipe, whereby angular oscillating movement is imparted to the spray pipe in response to rotational movement of said second element about its axis; and
   a coiled spring having one end connected to said first element and its remaining end connected to said second element in such fashion as to wind the spring during transmission of power from said first element to said second element.

3. A sprinkler as set out in claim 1 wherein said energy absorbing means comprises:
   a spring-loaded crank for absorbing a portion of the energy otherwise transmitted through a connecting link operatively connected between the motor and spray pipe and for cyclically releasing such stored energy to shorten the period during which the link moves overcenter relative to the crank axis.

4. A sprinkler as set out in claim 1 further comprising:
   means on said frame operatively engaged with the drive for said spray pipe for frictionally resisting angular movement of the spray pipe about its axis.

5. A sprinkler as set out in claim 1 further comprising:
   an adjustable drag brake mounted on said frame and operatively engaged with said spray pipe for frictionally resisting angular movement of the spray pipe about its axis.

6. A sprinkler as set out in claim 5, wherein said drag brake comprises means for varying the frictional resistance at preselected positions along the stroke of the spray pipe during angular movement thereof about its axis.

7. In an oscillating lawn sprinkler of the type having:
   a fluid motor having a drive shaft rotated by an incoming stream of water directed to the sprinkler;
   a perforated spray pipe pivotally mounted about an axis parallel to the axis of the motor drive shaft; and
   a rotatable crank assembly operatively connected between the motor drive shaft and the spray pipe for converting constant rotational movement of the motor drive shaft to reversible oscillating angular movement of the spray pipe;
   the improvement comprising:
   adjustable frictional brake means on said frame operatively engaged with an element subjected to angular movement coincident with angular movement of the spray pipe for frictionally resisting movement of the spray pipe about its axis.

8. A sprinkler as set out in claim 7, wherein said brake means is varied in application over the angular path of movement of the spray pipe to exert greater resistance to movement thereof as the spray pipe approaches a vertical position.